United States Patent
Iyer (10) Patent No.: US 7,103,735 B2
(45) Date of Patent: Sep. 5, 2006

(54) METHODS AND APPARATUS TO PROCESS CACHE ALLOCATION REQUESTS BASED ON PRIORITY

(75) Inventor: Ravishankar R. Iyer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 10/722,884

(22) Filed: Nov. 26, 2003

(65) Prior Publication Data

US 2005/0114605 A1    May 26, 2005

(51) Int. Cl.
*G06F 12/00* (2006.01)
(52) U.S. Cl. .......................... 711/158; 711/138
(58) Field of Classification Search .................. None
See application file for complete search history.

(56) References Cited

U.S. PATENT DOCUMENTS

| | | | | |
|---|---|---|---|---|
| 5,539,893 A * | 7/1996 | Thompson et al. | ......... | 711/122 |
| 5,875,464 A * | 2/1999 | Kirk | ......... | 711/129 |
| 5,913,215 A * | 6/1999 | Rubinstein et al. | ......... | 707/10 |
| 5,983,313 A * | 11/1999 | Heisler et al. | ......... | 711/105 |
| 6,601,151 B1 * | 7/2003 | Harris | ......... | 711/158 |
| 6,857,046 B1 * | 2/2005 | Batcher | ......... | 711/129 |
| 2003/0154112 A1* | 8/2003 | Neiman et al. | ......... | 705/5 |
| 2004/0193827 A1* | 9/2004 | Mogi et al. | ......... | 711/170 |

OTHER PUBLICATIONS

Chiou et al., *Application-Specific Memory Management for Embedded Systems Using Software-Controlled Caches*, Proceedings of the 37th Conference on Design Automation, pp. 416-419 (2000).

* cited by examiner

*Primary Examiner*—Brian R. Peugh
*Assistant Examiner*—Matthew Bradley
(74) *Attorney, Agent, or Firm*—Hanley, Flight & Zimmerman LLC (57) ABSTRACT

Methods and apparatus to process cache allocation requests are disclosed. In an example method, a priority level is assigned to a cache allocation request. Based on the priority level, an allocation probability associated with the cache allocation request is identified. Based on the allocation probability, the cache allocation request is identified with either an allocate condition and a bypass condition.

26 Claims, 4 Drawing Sheets

| Stream Type | Priority Level (P) | Allocation Probability (AP) |
|---|---|---|
| Primary Host Applications | 1 | 100% |
| Secondary Host Applications | 2 | 75% |
| Peripheral Applications | 3 | 50% |
| Other Applications | 4 | 25% |

| Stream Type | Priority Level (P) | Time Interval (T) | Allocation Probability (AP) |
|---|---|---|---|
| Primary Host Applications | 1 | 1 | 100% |
| | | 2 | 50% |
| | | 3 | 33% |
| | | 4 | 25% |
| Secondary Host Applications | 2 | 1 | 50% |
| | | 2 | 25% |
| | | 3 | 17% |
| | | 1 | 13% |
| Peripheral Applications | 3 | 1 | 33% |
| | | 2 | 17% |
| | | 3 | 11% |
| | | 4 | 8% |
| Other Applications | 4 | 1 | 25% |
| | | 2 | 13% |
| | | 3 | 8% |
| | | 4 | 6% |

METHODS AND APPARATUS TO PROCESS CACHE ALLOCATION REQUESTS BASED ON PRIORITY

TECHNICAL FIELD

The present disclosure relates generally to memory within processor systems, and more particularly, to methods and apparatus to process cache allocation requests based on priority.

BACKGROUND

Typically, cache is memory that a processor may access more quickly than random access memory (RAM) on a main memory chip. Cache may be identified based on how close and accessible a memory is to the processor. For example, a first-level unified (L1) cache may reside on the same chip as the processor. When the processor executes an instruction, for example, the processor first looks at its on-chip cache to find the data associated with that instruction to avoid performing a more time-consuming search for the data elsewhere (e.g., off-chip or on a RAM on a main memory chip).

Caches implemented in current processor systems are typically unaware of how cache lines are allocated to multiple incoming application streams. When a processor issues a load/store request for a data block in a cache, for example, the processor only checks for the data block in the cache. That is, if the data block is not in the cache, the cache controller issues a request to the main memory. Upon receiving a response from the main memory, the cache controller allocates the data block into the cache.

In processor systems employing multi-threaded cores, multi-core processors, multi-tasked cores, and/or virtualized cores, multiple incoming application streams may interfere with each other and as a result, may cause a shared cache to operate inefficiently. With multiple incoming application streams sharing cache space with equal priority often results in sub-optimal allocation of cache resources to the more important memory intensive application(s).

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
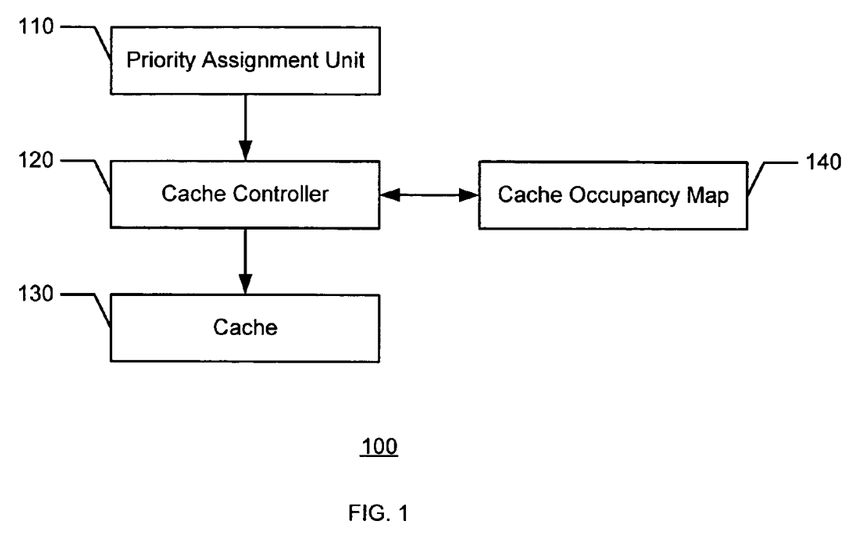
FIG. 1 is a block diagram representation of an example cache allocation system.
Figure 2:
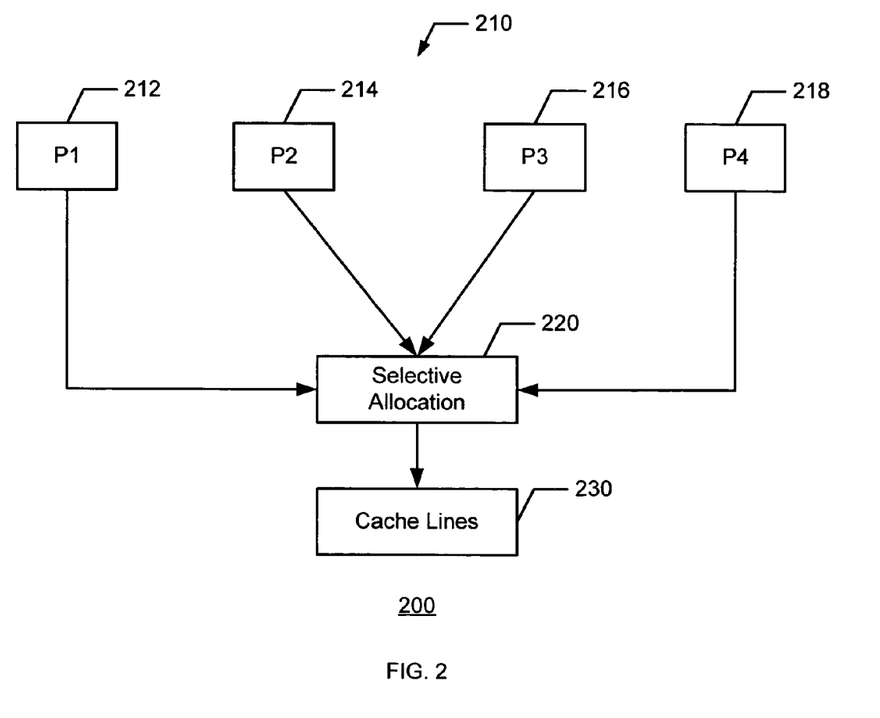
FIG. 2 is a block diagram representation of example cache allocation requests associated with the example cache allocation system shown in FIG. 1.

In the examples of FIGS. 1 and 2, the illustrated cache allocation system 100 includes a priority assignment unit 110, a cache controller 120, and a cache 130. In general, the priority assignment unit 110 assigns a priority level to each of the cache allocation requests 210, generally shown as 212, 214, 216, and 218, from multiple incoming application streams. For example, the priority assignment unit 110 may assign priority levels of P1, P2, P3 or P4 with P1 as the highest priority and P4 as the lowest priority. Based on the priority level, the cache controller 120 provides allocation selection 220 to increase cache efficiency and performance to accommodate the cache allocation requests 210 for cache lines 230 in the cache 130. For example, the cache 130 may be a first-level unified cache (L1), a second-level unified cache (L2), a third-level unified cache (L3), and/or any other suitable structures to store data as persons of ordinary skill in the art will readily recognize.

As noted above, the priority assignment unit 110 assigns a priority level to each of the cache allocation requests 210 of incoming application streams received by the cache controller 120. The priority assignment unit 110 may be implemented using an operating system (OS). For example, the OS may assign a priority level to an application thread running in a processor (e.g., the processor 1020 of FIG. 6) based on user-defined parameters. When the application thread issues a memory request or a series of memory requests, the OS assigns a priority to that application thread. In another example, the priority assignment unit 110 may be a compiler that assigns a priority to the application thread or each memory request made by the application thread. Alternatively, the priority assignment unit 110 may be hardware (e.g., an application specific integrated circuit (ASIC)) to assign a priority level to each of the cache allocation requests 210.

Regardless of the specific manner in which the priority assignment unit 110 is implemented, the priority assignment unit 110 assigns the priority level based on the nature of the cache allocation requests 210. For example, the priority assignment unit 110 may assign a higher priority to instructions than data, a higher priority to data loads than data stores, and/or a higher priority to demand requests than prefetches and speculative memory references. The priority assignment unit 110 may also assign the priority level based on the cache miss ratio of a particular thread. In other words, the priority assignment unit 110 may maintain a counter to track the number of cache allocation requests 210 and the miss rate for each cache. Based on the counter values, the priority assignment unit 110 may assign a higher priority to threads with higher cache allocation request rates, higher cache miss ratios, and/or higher hit ratios. Further, the priority assignment unit 110 may assign the priority level based on the origin of the incoming application streams (i.e., type of the source of the incoming application streams). If the cache 130 is a central processing unit (CPU) cache, for example, the priority assignment unit 110 may assign a higher priority to a CPU-initiated cache allocation request than other devices such as a memory controller and/or a network device that is attempting to send (i.e., push) data into the cache 130.

Figure 3:
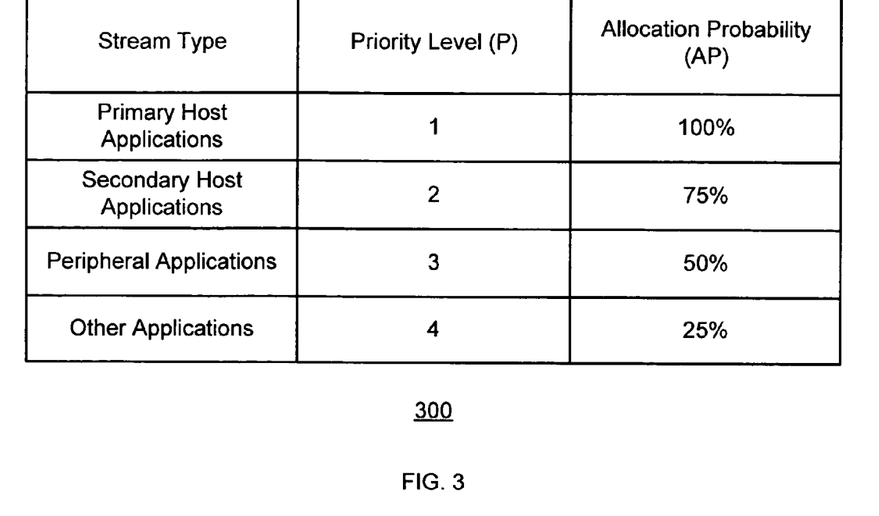
FIG. 3 is a block diagram representation of an example priority table associated with the example cache allocation system shown in FIG. 1.

In the example priority table 300 of FIG. 3, the priority assignment unit 110 assigns priority levels to each of the cache allocation requests 210 based on the type of the incoming application streams. That is, the priority assignment unit 110 may assign a priority level of P1 (i.e., a highest priority level) to incoming application streams associated with primary host applications such as front-end web service, a priority level of P2 to incoming application streams associated with secondary host applications such as mid-tier workload, a priority level of P3 to incoming application streams associated with peripheral applications such as input/output drivers and/or OS threads, and a priority level of P4 (i.e., a lowest priority level) to incoming application streams associated with other applications such as word processing applications.

The cache controller 120 assigns an allocation probability (AP) to each priority level. In the priority table 300, for example, the priority level P1 (i.e., the highest priority level) may be assigned an AP of 100%, the priority level P2 may be assigned an AP of 75%, the priority level P3 may be assigned an AP of 50%, and the priority level P4 (i.e., the lowest priority level) may be assigned an AP of 25%. For each thread requesting allocation, the cache controller 120 generates a random number between zero (0) and one hundred (100), and compares the random number to the AP assigned to each of the cache allocation requests 210. If the AP is greater than the random number, then the cache controller 120 allows allocation of the cache lines in the cache 130 to the requesting thread. On the other hand, if the AP is less than or equal to the random number, the cache controller 120 denies the allocation of cache lines in the cache 130 to the requesting thread.

For applications with different characteristics in different execution phases, the priority assignment unit 110 may dynamically change the priority levels assigned to the cache allocation requests 210. After a set of priority levels is established (e.g., as shown in FIG. 3) and the cache allocation requests 210 are assigned with priority levels, the cache allocation requests 210 and corresponding priority levels are provided to the cache controller 120 for processing. For example, the priority level of a cache allocation request may be provided by either directly encoding the priority level into the cache allocation request or using a stream identifier as an index into the priority table 300 that, in turn, maintains the mapping of the priority levels to stream types. To modify the priority levels dynamically during runtime, the cache controller 120 may change the priority value in the thread or run instructions to update the priority table 300.

In particular, the cache controller 120 may assign APs to each of the cache allocation requests 210 based on time intervals. In the example priority table 400 of FIG. 4, the cache controller 120 assigns APs based on time intervals. For example, the cache controller 120 may assign a series of time intervals (T1, T2, T3, and T4) to each of the cache allocation requests 210. Each of the time intervals T1, T2, T3, and T4 may be, for example, one millisecond (1 ms). Initially, the cache controller 120 places the incoming application stream in interval T1 and moves into interval T2 after the elapsed time T1, and cycles through each of the intervals so that using the priority table 400, the incoming application stream returns to interval T1 after the interval T4 is completed. Thus, the AP of the incoming application stream is based on the priority level and the current time interval. Specifically, the AP may be a function of the priority level (P) and the current time interval (T) so that AP=(1/P)×(1/T)×100.

As noted above, the cache 130 may be shared by multiple incoming application streams. Persons of ordinary skill in the art will readily recognize that the cache 130 includes the cache lines 230 (i.e., data) and tags (i.e., state information and/or replacement information). The memory space of the cache 130 may be partitioned so that each partition is assigned a particular priority level. Then, when a cache allocation request is made to a particular memory address, the priority assignment unit 110 assigns a priority level to that cache allocation request by comparing the address location to a memory range lookup table to identify the priority level corresponding to that particular memory address.

Figure 4:
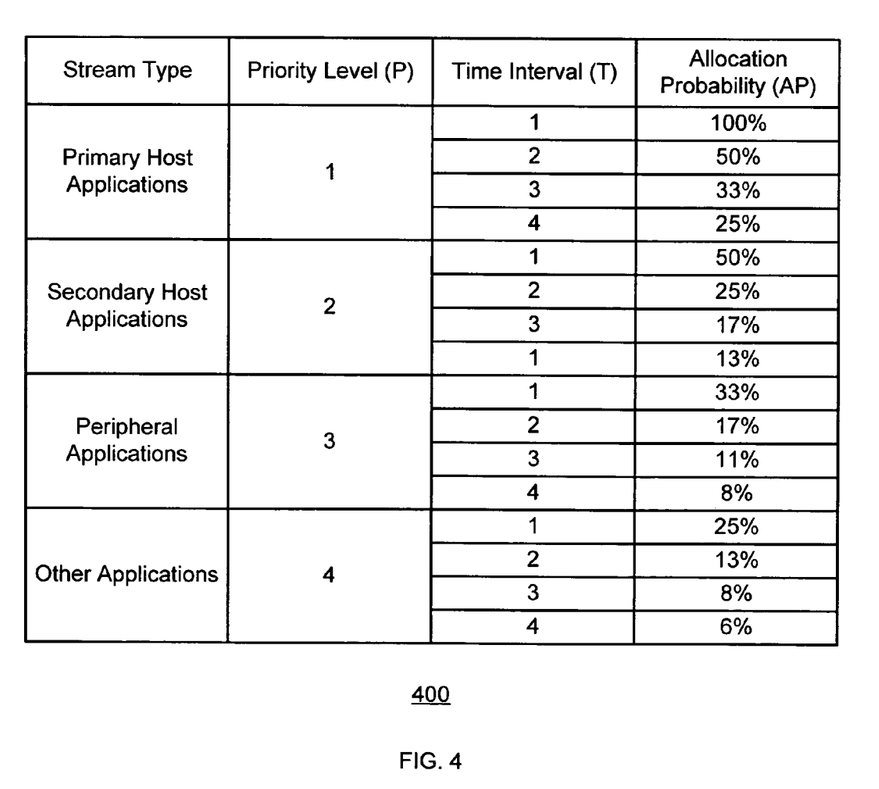
FIG. 4 is a block diagram representation of another example priority table associated with the example cache allocation system shown in FIG. 1.

While the stream types, the priority levels, the time intervals, and the APs of the priority tables 300 and 400 shown in FIGS. 3 and 4, respectively, are particularly well suited for implementation in four levels, persons of ordinary skill in the art will readily appreciate that the stream types, the priority levels, the time intervals, and the APs may be categorized using any number of levels (e.g., two or more).

Referring back to FIGS. 1 and 2, a cache occupancy map 140 may be used to provide the selective allocation 220 to further enhance the cache controller 120. The cache occupancy map 140 includes information associated with space utilization in the cache 130 that may be used by the cache controller 120 to determine the utilization of the cache 130. In particular, the cache occupancy map 140 may include one or more counters to keep track of the number of cache lines occupied in the cache 130 by each priority level. For example, the cache 130 may include one hundred cache lines 230 that are apportioned equally to each of the priority levels P1, P2, P3, and P4 (i.e., twenty-five cache lines per priority level). If the cache occupancy map 140 indicates that ten cache lines are occupied by data blocks of priority level P1 and twenty-five cache lines are occupied by data blocks of priority level P2 but data blocks of priority level P2 may need thirty-five cache lines, the cache controller 120 may re-apportion the cache lines 230 to accommodate the data blocks of priority level P2. That is, the cache controller 120 may apportion ten cache lines for data blocks of priority level P1 and thirty-five cache lines for data blocks of priority level P2. Alternatively, the cache occupancy map 140 may be a table including counters on a per set basis. The counters increment when a line is added to the cache 130 through cache allocation requests 210 and decrement when an eviction or invalidation causes a line to be removed from the cache 130.

Figure 5:
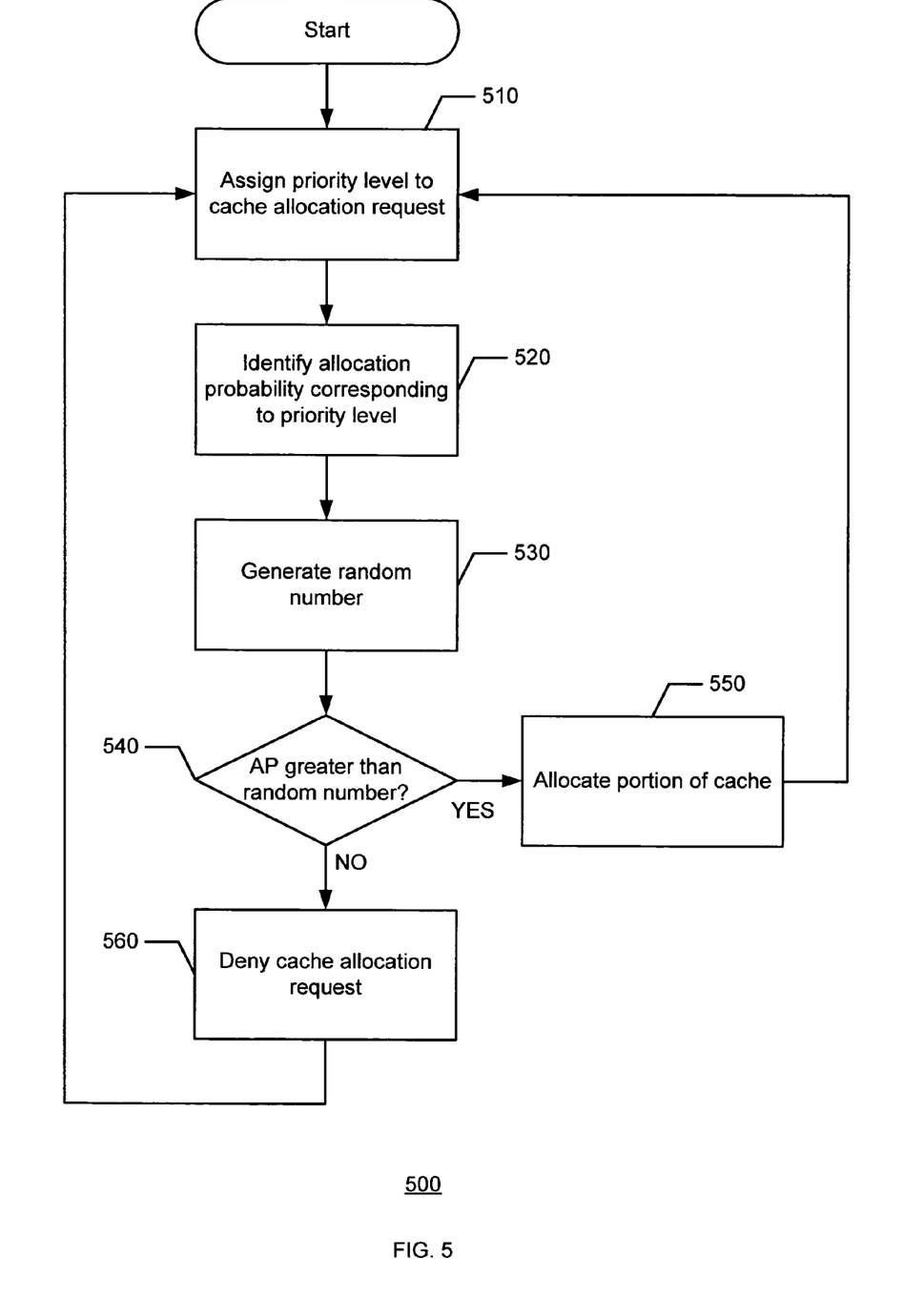
FIG. 5 is a flow diagram representation of one manner in which the system of FIG. 1 may process cache allocation requests.

A flow diagram 500 representing one manner in which the cache allocation system 100 of FIG. 1 may process cache allocation requests is illustrated in FIG. 5. Persons of ordinary skill in the art will appreciate that the flow diagram 500 of FIG. 5 may be implemented using machine accessible instructions that are executed by a processing system. In particular, the instructions may be implemented in any of many different ways utilizing any of many different programming codes stored on any of many computer-readable mediums such as a volatile or nonvolatile memory or other mass storage device (e.g., a floppy disk, a CD, and a DVD). For example, the machine accessible instructions may be embodied in a machine-readable medium such as an erasable programmable read only memory (EPROM), a read only memory (ROM), a random access memory (RAM), a magnetic media, an optical media, and/or any other suitable type of medium. Alternatively, the machine accessible instructions may be embodied in a programmable gate array and/or an application specific integrated circuit (ASIC). Further, although a particular order of actions is illustrated in FIG. 5, persons of ordinary skill in the art will appreciate that these actions can be performed in other temporal sequences. Again, the flow diagram 500 is merely provided as an example of one way to process cache allocation requests.

The flow diagram 500 begins with the priority assignment unit 110 assigning a priority level to each of the cache allocation requests 210 from multiple incoming application streams (block 510). For example, the priority assignment unit 110 may assign a priority level to the cache allocation request based on a stream type of the incoming application stream, a source type of the incoming application stream, and/or any other suitable methods as described in detail above. Based on the priority table 300, for example, the cache controller 120 identifies an AP corresponding to the priority level of each of the cache allocation requests 210 (block 520). The cache controller 120 may also identify an AP corresponding to the priority level and the current time interval of each of the cache allocation requests 210 using the priority table 300 and/or the priority table 400. To determine whether the cache allocation request 210 should be allowed or denied, the cache controller 120 identifies each of the cache allocation requests 210 using either an allocate condition or a bypass condition based on the AP. For example, the cache controller 120 may generate a random number (block 530), and compare the AP with the random number (block 540). Alternatively, the cache controller 120 may compare the AP to a pre-determined number. If the AP is greater than the random number (or the pre-determined number), the cache controller 120 identifies one of the cache allocation requests 210 with an allocate condition, and allocates a portion of the cache 130 (e.g., one or more cache lines 230) to the cache allocation request 210 (block 550). In contrast, if the AP is less than or equal to the random number (or the pre-determined number), the cache controller 120 identifies one of the cache allocation requests 210 with a bypass condition, and denies the cache allocation request (block 560). As a result, cache efficiency and performance are increased when multiple applications are sharing the cache 130.

Figure 6:
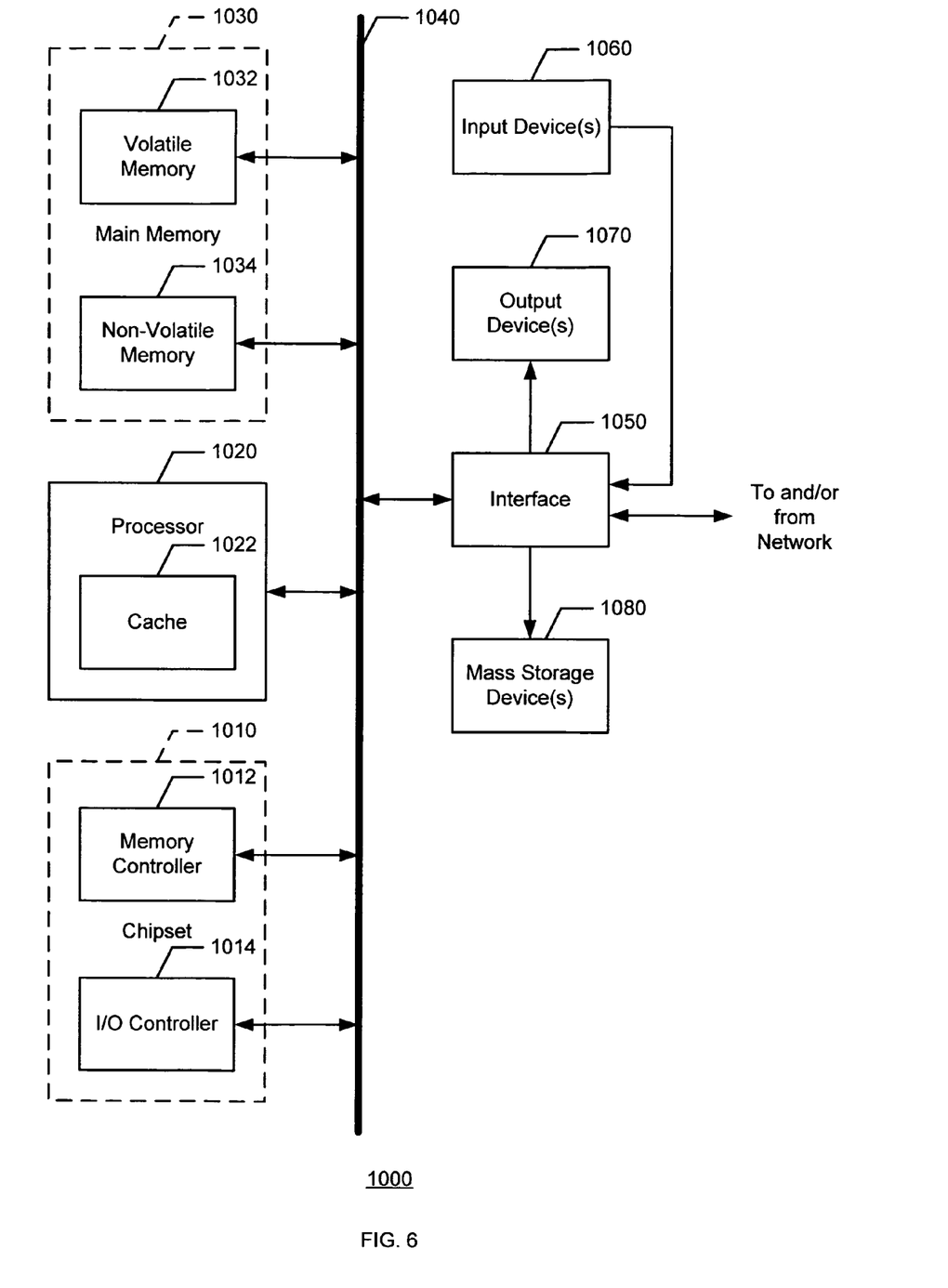
FIG. 6 is a block diagram representation of an example processor system that may be used to implement the system shown in FIG. 1.

FIG. 6 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 6 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® technology, the Intel® Itanium® technology, Intel® Centrino™ technology, and/or the Intel® XScale® technology. In the alternative, other processing technology may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 1032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 6 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

The methods and apparatus disclosed herein are particularly well suited for use in a processor cache. However, persons of ordinary skill in the art will appreciate that the teachings of the disclosure may be applied to process cache allocation requests in other suitable environments.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method comprising:
   assigning a priority level to a cache allocation request;
   identifying an allocation probability associated with the cache allocation request based on the priority level; and
   identifying the cache allocation request with one of an allocate condition or a bypass condition by comparing the allocation probability with at least one of a randomly-generated number or a pre-determined number.

2. A method as defined in claim 1, wherein assigning the priority level to the cache allocation request comprises assigning the priority level to the cache allocation request based on at least one of stream type, source type, or a cache occupancy map.

3. A method as defined in claim 1, wherein assigning a priority level to the cache allocation request comprises assigning a priority level to at least one of a cache allocation request associated with a primary host application, a cache allocation request associated with a secondary host application, or a cache allocation request associated with a peripheral application.

4. A method as defined in claim 1, wherein identifying the cache allocation request with one of an allocate condition or a bypass condition comprises identifying the cache allocation request with the allocate condition in response to the allocation probability being greater than at least one of the randomly-generated number or the pre-determined number.

5. A method as defined in claim 1, wherein identifying the cache allocation request with one of an allocate condition or a bypass condition comprises identifying the cache allocation request with the bypass condition in response to the allocation probability being less than or equal to at least one of the randomly-generated number or the pre-determined number.

6. A method as defined in claim 1 further comprising allocating a portion of a cache to the cache allocation request in response to identifying the cache allocation request with the allocate condition and denying the cache allocation request in response to identifying the cache allocation request with the bypass condition.

7. A machine accessible medium storing instructions, when executed, cause a processing system to:
   assign a priority level to a cache allocation request;
   identify an allocation probability associated with the cache allocation request based on the priority level; and
   identify the cache allocation request with one of an allocate condition or a bypass condition by comparing the allocation probability with at least one of a randomly-generated number or a pre-determined number.

8. A machine accessible medium as defined in claim 7, wherein the instructions, when executed, cause the machine to assign a priority level to the cache allocation request by assigning the priority level to the cache allocation request based on at least one of stream type, source type, or a cache occupancy map.

9. A machine accessible medium as defined in claim 7, wherein the instructions, when executed, cause the machine to assign the priority level to the cache allocation request by assigning a priority level to at least one of a cache allocation request associated with a primary host application, a cache allocation request associated with a secondary host application, and or a cache allocation request associated with a peripheral application.

10. A machine accessible medium as defined in claim 7, wherein the instructions, when executed, cause the machine to identify the cache allocation request with one of the allocate condition or the bypass condition by identifying the cache allocation request with the allocate condition in response to the allocation probability being greater than at least one of the randomly-generated number or the pre-determined number.

11. A machine accessible medium as defined in claim 7, wherein the instructions, when executed, cause the machine to identify the cache allocation request with one of the allocate condition or the bypass condition by identifying the cache allocation request with the bypass condition in response to the allocation probability being less than or equal to at least one of the randomly-generated number or the pre-determined number.

12. A machine accessible medium as defined in claim 7, wherein the instructions, when executed, cause the machine to allocate a portion of a cache to the cache allocation request in response to identifying the cache allocation request with the allocate condition, and to deny the cache allocation request in response to identifying the cache allocation request with the bypass condition.

13. A machine accessible medium as defined in claim 7, wherein the machine readable medium comprises one of a programmable gate array, application specific integrated circuit, erasable programmable read only memory, read only memory, random access memory, magnetic media, or optical media.

14. An apparatus comprising:
   a cache to store one or more data blocks of cache allocation requests;
   a priority assignment unit to assign a priority level to a cache allocation request; and
   a cache controller to identify an allocation probability associated with the cache allocation request based on the priority level, and to identify the cache allocation request with one of an allocate condition or a bypass condition by comparing the allocation probability with at least one of a randomly-generated number or a pre-determined number.

15. An apparatus as defined in claim 14, wherein the cache allocation request comprises at least one of a cache allocation request associated with a primary host application, a cache allocation request associated with a secondary host application, or a cache allocation request associated with a peripheral application.

16. An apparatus as defined in claim 14, wherein the priority assignment unit comprises at least one of an operating system, a compiler, or an application specific integrated circuit.

17. An apparatus as defined in claim 14, wherein the cache controller is to assign the priority level to the cache allocation request based on at least one of stream type, source type or a cache occupancy map.

18. An apparatus as defined in claim 14, wherein the cache controller is to identify the cache allocation request with the allocate condition in response to the allocation probability being greater than at least one of the randomly-generated number or the pre-determined number.

19. An apparatus as defined in claim 14, wherein the cache controller is to identify the cache allocation request with the bypass condition in response to the allocation probability being less than or equal to at least one of the randomly-generated number or the pre-determined number.

20. An apparatus as defined in claim 14, wherein the cache controller is to allocate a portion of the cache to the cache allocation request in response to identifying the cache allocation request with the allocate condition.

21. A processor system comprising:
a static random access memory (SRAM) to store one or more data blocks of cache allocation requests; and
a processor coupled to the SRAM, the processor to:
assign a priority level to a cache allocation request;
identify an allocation probability associated with the cache allocation request based on the priority level; and
identify the cache allocation request with one of an allocate condition and a bypass condition by comparing the allocation probability with at least one of a randomly-generated number or a ore-determined number.

22. A processor system as defined in claim 21, wherein the cache allocation request comprises at least one of a cache allocation request associated with a primary host application, a cache allocation request associated with a secondary host application, or a cache allocation request associated with a peripheral application.

23. A processor system as defined in claim 21, wherein the processor is to assign the priority level to the cache allocation request based on at least one of stream type, source type, or a cache occupancy map.

24. A processor system as defined in claim 21, wherein the processor is to identify the cache allocation request with the allocate condition in response to the allocation probability being greater than at least one of the randomly-generated number or the pre-determined number.

25. A processor system as defined in claim 21, wherein the processor is to identify the cache allocation request with the bypass condition in response to the allocation probability being less than or equal to at least one of the randomly-generated number or the pre-determined number.

26. A processor system as defined in claim 21, wherein the processor is to allocate a portion of the SRAM to the cache allocation request in response to identifying the cache allocation request with the allocate condition.

* * * * *

UNITED STATES PATENT AND TRADEMARK OFFICE
CERTIFICATE OF CORRECTION

PATENT NO.        : 7,103,735 B2                                          Page 1 of 1
APPLICATION NO.   : 10/722884
DATED             : September 5, 2006
INVENTOR(S)       : Iyer It is certified that error appears in the above-identified patent and that said Letters Patent is hereby corrected as shown below:

Column 8
Line 2, "and or a cache" should read as --or a cache--.

Column 9
Line 17, "ore-determined" should read as --pre-determined--.

Signed and Sealed this

Twenty-seventh Day of February, 2007

JON W. DUDAS
*Director of the United States Patent and Trademark Office*